United States Patent [19]

Wang

[11] Patent Number: 5,049,640

[45] Date of Patent: Sep. 17, 1991

[54] POLYETHERKETONES

[75] Inventor: Pen C. Wang, Houston, Tex.

[73] Assignee: Shell Oil Company, Houston, Tex.

[21] Appl. No.: 314,514

[22] Filed: Feb. 23, 1989

[51] Int. Cl.$^5$ .................. C08G 8/02; C08G 14/00; C08G 69/14

[52] U.S. Cl. ..................................... 528/125; 528/323

[58] Field of Search ............................ 528/323, 125

[56] References Cited

U.S. PATENT DOCUMENTS

| | | | |
|---|---|---|---|
| 4,320,224 | 3/1982 | Rose et al. | 528/125 |
| 4,885,351 | 12/1989 | Wang | 528/323 |
| 4,886,863 | 12/1989 | Wang | 528/323 |
| 4,889,907 | 12/1989 | Wang | 528/117 |
| 4,906,725 | 3/1990 | Wang | 528/196 |

Primary Examiner—John Kight, III
Assistant Examiner—Kathryne E. Shelborne

[57] ABSTRACT

Polymeric polyetherketones characterized by relatively high glass transition temperatures comprise moieties derived from a halo-substituted aryl ketone alternating with moieties derived from a hydroxyaryl-substituted 1,6-diaza [4.4] spirodilactam having the hydroxyaryl substituents on the spiro ring nitrogen atoms and, optionally, moieties derived from a di(hydroxyphenyl) compound.

23 Claims, No Drawings

POLYETHERKETONES

FIELD OF THE INVENTION

This invention relates to a novel class of polyetherketones which incorporate within the polymer chain different types of cyclic structures. More particularly, the invention relates to novel linear alternating polymers having moieties of a di(arylene) ketone alternating with moieties of an oxyaryl-substituted 1,6-diaza [4.4] spirodilactam and, optionally, moieties of a di(oxyphenyl) compound.

BACKGROUND OF THE INVENTION

The class of thermoplastic polymers is well known in the art, in part because of the property inhibited by many thermoplastics of being deformable at relatively low temperatures. Such thermoplastics are processed by conventional techniques such as extrusion or injection molding into sheets, films, fibers and molded articles of established utility. However, the low temperature deformation that makes many thermoplastics useful serves to preclude their usage as engineering plastics in applications where elevated temperature is likely to be encountered.

In order to increase the melting point or glass transition temperature of a thermoplastic, it is often useful to include the presence of multiple ring systems within the polymer chain. The rings of such a cyclic system are frequently connected by linking groups such as keto, oxy and sulfonyl. One class of these polycyclic thermoplastic polymers is designated by the term polyetherketone because of the presence within the polymer chain of aromatic rings connected by ether, i.e., oxo, linkages as well as by keto groups. Rose et al, U.S. Pat. No. 4,320,224, describe polymers having repeating units of formula

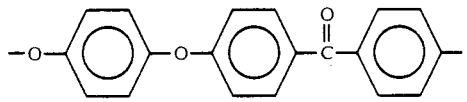

employed alone or in combination with other similar repeating units. A commercial polyetherketone of this type, marketed by Imperial Chemical Industries, Ltd., under the tradename Victrex Polyketone has a glass transition temperature on the order of 150° C. It would be of advantage to provide a class of polyetherketones of even higher glass transition temperatures.

SUMMARY OF THE INVENTION

The present invention provides a novel class of polyetherketones having a plurality of different types of cyclic structures within the polymer chain. More particularly, the invention provides a class of linear alternating polyetherketones wherein moieties of an arylene ketone alternate with moieties of an oxyaryl-substituted 1,6-diaza [4.4] spirodilactam and, optionally, moieties of a di(oxyphenyl) compound. The polyetherketones of the invention are characterized by relatively high glass transition temperatures.

DESCRIPTION OF THE INVENTION

The polyetherketone products of the invention are most conveniently produced by reaction of a halo-substituted aryl ketone with a salt, preferably an alkali metal salt, of a hydroxyaryl-substituted 1,6-diaza [4.4] spirodilactam and, optionally a salt of a di(hydroxyphenyl) compound. Reaction serves to produce a linear alternating copolymer or terpolymer wherein moieties derived from the halo-substituted aryl ketone, as by halogen removal, alternate with moieties of oxyphenyl-substituted spirodilactam and, if present, moieties of a di(oxyphenyl) compound.

The spirodilactam moieties which are present in the polymers of the invention are derived from a 1,6-diazaspiro[4.4]nonane-2,7-dione compound which is substituted on each spiro ring nitrogen atom with a hydroxyaryl-containing substituent. One class of such spirodilactams has up to 60 carbon atoms inclusive and is represented by the formula

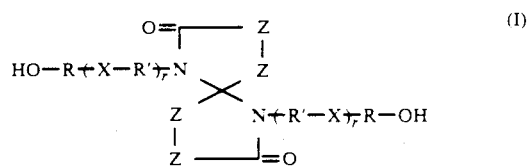

wherein Z independently is $>C(Z')_2$ in which Z' independently is hydrogen, lower alkyl of up to 4 carbon atoms inclusive, preferably methyl, halo, preferably the lower halogens fluoro and chloro, or aryl, preferably phenyl, or Z is such that adjacent Z moieties taken together form a ring system Z" of from 5 to 7 ring atoms, up to two of which are heteroatoms selected from nitrogen, oxygen or sulfur, with the remainder of the ring atoms being carbon atoms, there being up to 15 carbon atoms inclusive in each Z", two of which form a bridge between the carbon atoms connected by the adjacent Z groups. In formula I, R independently is aromatic of up to 15 carbon atoms and up to two aromatic rings, inclusive. R' independently is R or an aliphatic group of up to 10 carbon atoms, r independently is 0 or 1 and X independently is a direct valence bond, alkylene of up to 8 carbon atoms, oxo, thio, carbonyl, dioxyphenylene, 2,2-di(oxyphenyl)propane, or dioxydiphenylene. Each of R and R' is hydrocarbyl containing only atoms of carbon and hydrogen or is substituted hydrocarbyl containing additional atoms in the form of inert monovalent carbon atom substituents such as halo, preferably the middle halogens chloro or bromo.

Spirodilactams of a considerable variety of structures are therefore suitably employed as the source of the spirodilactam moieties in the polymers of the invention. In the embodiment wherein the Z moieties of the compounds of formula I are not part of a fused ring system and are therefore acyclic, i.e., Z is $>C(Z')_2$, the hydroxyaryl-substituted spirodilactams are illustrated by 1,6-di(4-hydroxyphenyl)-1,6-diazaspiro[4.4]nonane-2,7-dione, 1,6-di(3-hydroxy-4-chlorophenyl)-3,8-dimethyl-1,6-diazaspiro[4.4]nonane-2,7-dione, 1,6-di[4-(3-hydroxybenzoyl)phenyl]-1,6-diazaspiro[4.4]nonane-2,7-dione, 1,6-di(4-hydroxyphenyl)-3,3,4,4,8,8,9,9-octamethyl-1,6-diazaspiro[4.4]nonane-2,7-dione, 1,6-di[4-(4'-hydroxybisphenyl)]-3,3-dimethyl-1,6-diazaspiro[4.4]nonane-2,7-dione, 1,6-di[2-(4-hydroxyphenyl)propyl]-1,6-diazaspiro[4.4]nonane-2,7-dione, 1,6-di[4-(4-hydroxyphenylisopropyl)phenyl]-1,6-diazaspiro[4.4]nonane-2,7-dione and 1,6-di(3-hydroxyphenyl)-3,4,8,9-tetrafluoro-1,6-diazaspiro[4.4]nonane-2,7-dione. In the embodiment wherein adjacent Z moieties of each spiro ring form a cyclic fused ring substituent of the spiro ring system, Z", illustrative spirodilactams include 1,6-di(4- hydroxyphenyl)-3,4,8,9-dibenzo-1,6-diazaspiro[4.4]nonane-2,7-dione, 1,6-di[4-(4-hydroxyphenyloxy)phenyl]-3,4,8,9-di(pyrido)-1,6-diazaspiro[4.4]nonane-2,7-dione and 1,6-di[4-(4-hydroxyphenylthio)phenyl]-3,4,8,9-di(cyclopentano)-1,6-diazaspiro[4.4]nonane-2,7-dione. Also suitable are those spirodilactams where one spiro ring has a cyclic fused ring substituent and the other spiro ring is free from fused ring substituents, e.g., 1,6-di(4-hydroxyphenyl)-3,4-benzo-8-methyl-1,6-diazaspiro[4.4]nonane-2,7-dione and 1,6-di[1-(4-hydroxynaphthyl)]-3,4-cyclohexano-1,6-diazaspiro[4.4]nonane-2,7-dione.

In general, the compounds of the above formula I wherein both R and R' are aromatic and hydrocarbyl are preferred, especially such compounds wherein each r is 0. The class of 1,6-di(hydroxyphenyl) spirodilactams is particularly preferred, especially the 1,6-di(4-hydroxyphenyl) spirodilactams. Within the spirodilactam portion of the molecule, compounds wherein both spiro rings are free from fused ring substituents are preferred as are the spirodilactams wherein both rings have a fused ring substituent. The compound 1,6-di(4-hydroxyphenyl)-1,6-diazaspiro[4.4]nonane-2,7-dione is a particularly preferred member of the former class and 1,6-di(4-hydroxyphenyl)-3,4,8,9-dibenzo-1,6-diazaspiro[4.4]nonane-2,7-dione is a particularly preferred member of the latter class.

The hydroxyaryl-substituted spirodilactams of the above formula I are described and claimed as compositions of matter in copending U.S. patent application Ser. No. 245,618, filed Sept. 16, 1988 now U.S. Pat. No. 4,939,251. The general method of their production described and claimed in this copending application which is incorporated herein by reference, is by reaction of at least one hydroxy-containing primary amino compound and a spirodilactam precursor. In terms of the spirodilactams of formula I, the hydroxy-containing primary amino compound is represented by the formula

HO—R—X—R')ᵣNH₂ (II)

wherein R, R', r and X have the previously stated meanings. The spirodilactam precursor is a 4-oxoheptanedioic acid compound or a 1,6-diazaspiro[4.4]nonane-2,7-dione compound, i.e., a spirodilactone. In terms of the spirodilactams of formula I, the 4-oxoheptanedioic acid compounds are represented by the formula

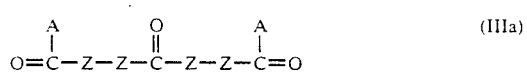

(IIIa)

wherein Z has the previously stated meaning and A independently is hydroxy, lower alkoxy of up to 4 carbon atoms inclusive, or halo, preferably middle halogen. The spirodilactone employed as a precursor of the spirodilactams of formula I is represented by the formula

(IIIb)

wherein Z has the previously stated meaning.

The acyclic 4-oxoheptanedioic acid compounds are known compounds or are produced by known methods, but certain of the esters of formula IIIa, i.e., the compounds wherein A is alkoxy, are conveniently produced by the process disclosed and claimed in copending U.S. patent application Ser. No. 171,999, filed Mar. 23, 1988, now U.S. Pat. No. 4,800,231, incorporated herein by reference, which involves the reaction of formaldehyde and an unsaturated carboxylic acid ester such as methyl acrylate, ethyl methacrylate or propyl crotonate in the presence of a catalyst system comprising a thiazolium salt and a tertiary amine. Interconversion of the esters, acids or acid halides of formula IIIa is by conventional methods. The production of 4-oxoheptanedioic acid compounds having cyclic substituents is by the process of Cava et al, J. Am. Chem. Soc., 20, 6022 (1955). The spirodilactones of formula IIIb are produced by the process of Pariza et al, Synthetic Communications, Vol. 13 (3), pp. 243–254 (1983) or by the process of Conover et al, U.S. Pat. No. 1,999,181.

The hydroxy-containing primary amino compound and the spirodilactam precursor react in a molar ratio of 2:1 although in practice reactant ratios of from about 8:1 to about 1:1.5 are satisfactory. Reactant ratios that are substantially stoichiometric are preferred. Reaction is conducted in liquid phase solution in an inert reaction diluent such as an N-alkylamide, e.g., N,N-dimethylformamide, N,N-dimethylacetamide or N-methyl-2-pyrrolidone. Reaction takes place under reaction conditions at an elevated temperature, typically from about 80° C. to about 250° C. The reaction pressure should be sufficient to maintain the reaction mixture in a liquid phase at reaction temperature. Such pressures are up to about 20 atmospheres. Subsequent to reaction the spirodilactam product (formula I) is recovered from the product mixture by conventional methods such as solvent removal, precipitation or extraction. Recovery of the spirodilactam product is not required, however, and particularly in cases where substantially stoichiometric quantities of reactants were employed the spirodilactam may be reacted further, e.g., to form an alkali metal salt, without isolation.

The halo-substituted aryl ketone reactant in the process of the invention is a compound of from 2 to 4 aromatic rings, at least two of which are connected by a carbonyl group, i.e., a

group, and having a halogen substituent on each of the terminal aromatic rings. One class of such halo-substituted aryl ketone compounds is represented by the formula

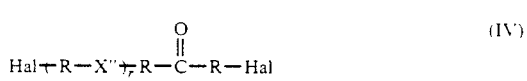

Hal—R—X"ᵣR—C—R—Hal (IV)

wherein R, X and r have the previously stated meaning, X" is a direct valence bond, oxo, thio, carbonyl, dioxyphenylene, or dioxydiphenylene and Hal independently is halogen, i.e., fluoro, chloro, bromo or iodo, but preferably is lower halogen. The substitution of the linking moieties or halogen substituents on each R is variable and is suitably ortho or para relative to the other linking group or halogen attached to R, or the substitution may be mixtures of ortho and para. The preferred halo-substituted aryl ketone reactants are those wherein each linking group or halogen substituent attached to each R is para to the other linking group or halo-substituted aryl ketone reactants of the above formula IV are di(4-chlorophenyl) ketone, di(2-fluorophenyl) ketone, 4-(4-chlorophenyloxy) phenyl 4-fluorophenyl ketone, 4-(4-bromophenylthio)phenyl 4-bromophenyl ketone, di[4-(4-fluorophenyl)phenyl] ketone, di(4-fluorophenyl) ketone, 1-(4-chloronaphthyl) 2-fluorophenyl ketone, 4-(4-chlorophenyloxy)phenyl 2-chlorophenyl ketone and di(4-bromophenyl) ketone. Of those halo-substituted aryl ketone reactants of the above formula IV, the compounds wherein r is 0 are preferred, especially those compounds wherein R is phenylene and particularly those compounds where R is p-phenylene. These halo-substituted aryl ketones are known compounds or are produced by known methods.

The source of the optional third monomer of the polymers of the invention is a di(hydroxyphenyl) compound of up to 30 carbon atoms and up to 2 aromatic rings. Illustrative of such compounds are dihydroxybenzenes such as hydroquinone and resorcinol, dihydroxynaphthalenes such as 1,5-dihydroxynaphthalene, 2,7-dihydroxynaphthalene and 2,6-dihydroxynaphthalene as well as compounds represented by the formula

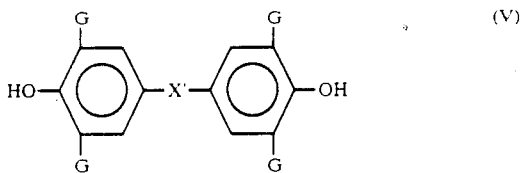

wherein G independently is hydrogen, lower alkyl or halo, preferably hydrogen or middle halo and X' is a direct valence bond, alkylene of up to 8 carbon atoms, inclusive, oxo, thio or carbonyl. Illustrative of the compounds of formula V are 2,2-di(4-hydroxyphenyl)propane, di(4-hydroxy-3-methylphenyl)methane, 2,2-di(4-hydroxy-3,5-dibromophenyl)propane, (4-hydroxy-3-bromophenyl) (4-hydroxyphenyl)ether, (4-hydroxy-3,5-dibromophenyl) (4-hydroxyphenyl)ketone, 2-(4-hydroxy-3,5-dibromophenyl)2-(4-hydroxy-3-chloro-5-methylphenyl)propane 4,4'-dihydroxybiphenyl and di(4-hydroxyphenyl)methane. The preferred X' group is 2,2-propylene and the compound 2,2-di(4-hydroxyphenyl)propane, also known as bisphenol A or BPA, is a preferred member of the class of compounds of formula V.

The process of producing the novel polymers of the invention comprises the reaction of the halo-substituted aryl ketone reactant with the alkali metal salt of the hydroxyaryl-substituted spirodilactam, and if third monomer is present, the alkali metal salt of the di(hydroxyphenyl) compound. The product is, in one modification, a linear alternating copolymer of arylene ketone moieties derived from the halo-substituted aryl ketone reactant of formula IV by halogen loss and moieties derived from the halo-substituted aryl ketone reactant of formula IV by halogen loss and moieties of oxyaryl-substituted spirodilactam of formula I by loss of acidic hydrogens. In the modification where third monomer is present, the product is a linear alternating terpolymer wherein arylene ketone moieties alternate with oxyaryl-substituted spirodilactam moieties and moieties of the di(oxyphenyl)compound derived from the di(hydroxyphenyl)compound by loss of acidic hydrogens.

The polymerization process is preceded by the formation of the alkali metal salt of the hydroxyaryl-substituted spirodilactam and, if present, the di(hydroxyphenyl) compound. Although lithium, sodium, potassium, rubidium or cesium salts are suitably employed in the polymerization process of the invention, the preferred alkali metal salts are sodium salts or potassium salts. The alkali metal salts are typically produced by dissolving the hydroxyaryl-substituted spirodilactam and, if present, the di(hydroxyphenyl) compound, in a suitable reaction diluent and adding a slight stoichiometric excess of an alkali metal base, e.g., the hydroxide, carbonate or bicarbonate, while the water present or formed during reaction is removed by conventional methods such as extraction or distillation. A preferred method of removing water is by azeotropic distillation with a portion of the reaction diluent if the diluent forms a low-boiling azeotrope with water. A suitable reaction diluent comprises a mixture of an N-alkylamide such as N,N-dimethylacetamide or N-methyl-2-pyrrolidone with a miscible second diluent with which water forms an azeotrope, e.g., an alkylated benzene such toluene or ethylbenzene. Subsequent to reaction and water removal, the alkali metal salts are recovered, if desired, by conventional methods such as precipitation or extraction. However, the salts are most frequently employed in situ without isolation in the reaction with the halo-substituted ketone which is added subsequently or is present during the preparation of the alkali metal salt. When terpolymer is to be produced, the alkali metal salt of the di(hydroxyphenyl) compound and the alkali metal salt of the hydroxyaryl-substituted spirodilactam are conveniently produced by neutralization of a mixture of the two hydroxy-containing compounds. Alternatively, however, the two alkali metal salts are produced separately and subsequently mixed.

The polymerization is conducted by contacting the reactants under polymerization conditions in a reaction diluent. Preferred diluents are polar diluents which are capable of dissolving at least a portion of each reactant at polymerization temperature and include glycols, ethers, esters and ketones. In a particularly preferred embodiment the polymerization diluent is the same as the diluent employed in the production of the alkali metal salt, but such is not required.

In the polymerization mixture, no alkali metal salt of di(hydroxyphenyl)compound is required since the presence of the third monomer is optional. However, when present, the alkali metal salt of the di(hydroxyphenyl)propane compound is present in a molar quantity up to nine times the molar quantity of the alkali metal salt of the hydroxyaryl-substituted spirodilactam, but preferably is present in a molar quantity from about twice to about one half the molar quantity to the alkali metal salt of the hydroxyaryl-substituted spirodilactam. The halo-substituted aryl ketone reactant is present in a molar ratio of from about 3:1 to about 1:3 with the total molar quantity of alkali metal salt reactant(s). However, the ketone reactant is preferably present in a substantially stoichiometric quantity, i.e., in a molar ratio of about 1:1 to the total alkali metal salt.

Polymerization takes place at an elevated temperature, typically from about 80° C. to about 250° C. but more often from about 100° C. to about 200° C. The polymerization pressure is sufficient to maintain the polymerization reaction mixture in the liquid phase at polymerization temperature. Such pressures are up to about 20 atmospheres but pressures up to about 10 atmospheres are preferred. During the polymerization, reactant contact is maintained by conventional methods such as shaking or stirring and subsequent to reaction the polymer product is recovered by well known techniques such as precipitation, solvent removal or extraction.

The polymer product is a linear alternating polymer wherein moieties of a di(arylene)ketone of from 2 to 4 aromatic rings, at least two of which are connected by a carbonyl group with any additional rings being fused or connected by a direct valence bond, oxo, thio, carbonyl, dioxyphenylene, or dioxydiphenylene, alternates with moieties of an oxyaryl-substituted 1,6diaza [4.4] spirodilactam having the oxyaryl substituents on the spiro ring nitrogen atoms and, optionally, di(oxyphenyl) moieties. When the polymer product is a copolymer having only moieties of the arylene ketone reactant and the spirodilactam, the polymer is represented by repeating first segments of the formula

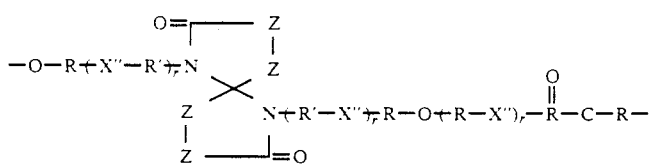

wherein R, R', r, X" and Z have the previously stated meanings. In the embodiment wherein the polyetherketone product is a terpolymer the product additionally contains second segments represented by the formula .

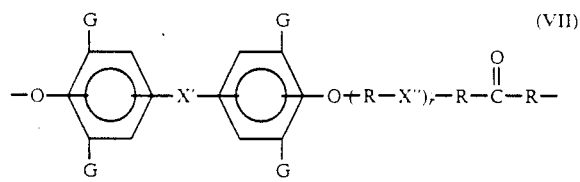

wherein G, R, X', X" and r have the previously stated meanings. Within the terpolymer chain a plurality of segments of formula VI are found randomly with a plurality of segments of formula VII with the ratio of segments of formula VII to segments of formula VI being up to about 9:1 but preferably from about 2:1 to about 1:2. In general, the copolymer of the invention are preferred products over corresponding terpolymers. In the cases of such copolymers, of course, there will only be segments of formula VI in the polymer chain.

The nomenclature of the polymer products is not easily determined because of the complexity thereof. However, a representative copolymer has alternating units of di(4-phenylene) ketone and 1,6-di(4-oxyphenyl)-1,6-diazaspiro[4.4]nonane-2,7-dione illustratively produced by reaction of di(4-fluorophenyl) ketone, alternatively termed 4,4'-difluorobenzophenone, with the sodium salt of 1,6-di(4-hydroxyphenyl)-1,6-diazaspiro[4.4]nonane-2,7-dione. In a representative terpolymer, units of 2,2-di(4-oxyphenyl)propane will be additionally present when the polymerization mixture contains the sodium salt of 2,2-di(hydroxyphenyl)propane. The identity of other polymer products will be apparent from consideration of the above formulas for the reactants and the polymer products. Of particular interest are the copolymers and the terpolymers of the invention having a molecular weight from about 1,000 to about 100,000.

The polymeric polyetherketones of the invention are thermoplastic polymers characterized by relatively high glass transition temperatures, typically over 200° C. or even higher. Thus, the polymers are processed by the techniques conventionally employed for thermoplastics to produce sheets, films and molded articles but the products are dimensionally stable in applications where elevated temperatures are likely to be encountered. Among such applications are containers for food and drink and base parts for electrical and electronic equipment.

The invention is further illustrated by the following Illustrative Embodiment which should not be construed as limiting the invention.

ILLUSTRATIVE EMBODIMENT

In a 500 ml round-bottom flask equipped with a mechanical stirrer was placed a mixture of 16.9 g (0.05 mole) of 1,6-di(4-hydroxyphenyl)-1,6-diazaspiro[4.4]nonane-2,7-dione, 10.9 g (0.05 mole) of 4,4'-difluorobenzophenone, 7.0 g of potassium carbonate, 100 ml of N-methyl-2-pyrrolidone and 50 ml of toluene. The mixture, while being stirred, was heated to 130° C.-140° C. and the water present or formed was removed by azeotropic distillation. When water removal was complete, the temperature of the mixture was raised to 190°-200° C. and maintained for 12 hours while stirring continued. The resulting mixture was then cooled and poured into methanol. The precipitated polymer product was recovered by filtration, pulverized, washed with hot water and then with 2 liters of methanol. The polymer product was then dried in a vacuum oven and when dry was found to have a glass transition temperature of 232° C. The nuclear magnetic resonance spectra of the product were consistent with a structure of alternating units of di(4-phenylene) ketone and units of 1,6-di(oxyphenyl)-1,6-diazaspiro[4.4]nonane-2,7-dione.

What is claimed is:

1. A linear alternating polyetherketone polymer wherein moieties of a di(arylene) ketone of from 2 to 4 aromatic rings, at least two of which are connected by a carbonyl group with an additional rings being fused or connected by a direct valence bond, oxy, thio, carbonyl, dioxyphenylene, or dioxydiphenylene, alternate with moieties of an oxyaryl-substituted 1,6-diaza [4.4] spirodilactam having the oxyaryl substituents on the spiro ring nitrogen atoms and, optionally moieties of a di(oxyphenyl)compound.

2. The polyetherketone polymer of claim 1 having a plurality of first segments represented by the formula

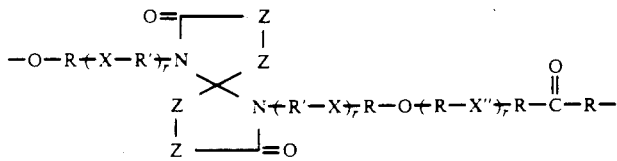

and, optionally, a plurality of second segments represented by the formula

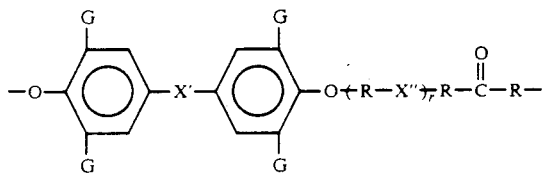

wherein R is aromatic of up to 15 carbon atoms and up to two aromatic rings, inclusive, R' is R or an aliphatic group of up to 10 carbon atoms inclusive, r is zero or 1, Z independently is $>C(Z')_2$ in which Z' independently is hydrogen, lower alkyl, lower halo or phenyl, or Z is such that two adjacent Z groups taken together form ring system Z" of from 5 to 7 ring atoms, up to two of which are heteroatoms selected from nitrogen, oxygen or sulfur with the remainder of any ring atoms being carbon atoms, there being up to 15 carbon atoms in each Z", two of which connect the carbon atoms connected by the two adjacent Z groups, X is a direct valence bond, alkylene of up to 8 carbon atoms inclusive, oxy, thio, carbonyl, dioxyphenylene, 2,2-di(4-oxyphenyl)-propane, or dioxydiphenylene, X" is a direct valence bond, oxy, thio, carbonyl, dioxyphenylene or dioxydiphenylene, X' is a direct valence bond, alkylene of up to 8 carbon atoms inclusive, oxy, thio or carbonyl, and G is hydrogen, lower alkyl or middle halogen, the ratio of the second segments to the first segments being up to 9:1.

3. The polyetherketone polymer of claim 2 wherein the polymer is a copolymer.

4. The polyetherketone polymer of claim 3 wherein each r is 0.

5. The polyetherketone polymer of claim 4 wherein R is phenylene.

6. The polyetherketone polymer of claim 5 wherein each Z is $>C(Z')_2$.

7. The polyetherketone polymer of claim 6 wherein Z' is hydrogen.

8. The polyetherketone polymer of claim 7 wherein R is p-phenylene.

9. The polyetherketone polymer of claim 5 wherein adjacent Z groups are Z".

10. The polyetherketone polymer of claim 9 wherein Z" is benzo.

11. The polyether ketone polymer of claim 10 where R is p-phenylene.

12. The polyetherketone polymer of claim 3 wherein the polymer is a random terpolymer of first segments and second segments, the ratio of second segments to first segments being from about 2:1 to about 1:2.

13. The polyetherketone polymer of claim 12 wherein G is hydrogen or middle halo.

14. The polyetherketone polymer of claim 13 wherein each r is 0.

15. The polyetherketone polymer of claim 14 wherein R is phenylene.

16. The polyetherketone polymer of claim 15 wherein G is hydrogen.

17. The polyetherketone polymer of claim 16 wherein X' is 2,2-propylene.

18. The polyetherketone polymer of claim 17 wherein Z is $>C(Z')_2$.

19. The polyetherketone polymer of claim 18 wherein Z' is hydrogen.

20. The polyetherketone polymer of claim 19 wherein R is p-phenylene.

21. The polyetherketone polymer of claim 17 wherein adjacent Z groups are Z".

22. The polyetherketone polymer of claim 18 wherein Z" is benzo.

23. The polyetherketone polymer of claim 22 wherein R is p-phenylene.

* * * * *